INVENTOR
BLANCHE HARDIGAN
BY Raymond R. Skolnick
AGENT

INVENTOR
BLANCHE HARDIGAN
BY Raymond R. Skolnick
AGENT

United States Patent Office 3,080,679

Patented Mar. 12, 1963

3,080,679
TALKING DOLLS

Blanche Hardigan, 2350 Tiemann Ave., Bronx, N.Y.
Filed Dec. 19, 1960, Ser. No. 76,941
4 Claims. (Cl. 46—232)

This invention relates to dolls and more particularly to talking dolls employing playback means for playing back taped recordings.

Heretofore talking dolls have employed diaphragms for making a sound simulating a human voice saying "mama" or they have employed mechanical devices similar to music boxes. Some dolls have employed recorded messages on phonographs records. The diaphragm type of devices are limited to the simulation of one simple word and the phonograph record method or music box method is restricted to small messages otherwise they become too bulky for insertion into a small doll.

It is therefore an object of this invention to provide an improved means for playing recorded messages within a doll.

Another object of this invention is to provide a talking means for a doll where the messages can be readily interchanged.

A still further object of this invention is to provide a talking means for a doll where the recorded messages are on magnetic tape.

A still further object of this invention is to provide a talking means for a doll which is electro-mechanical, small, compact and endurable.

To these ends the invention contemplates the use of a playback unit, speaker and power supply which are all set within a doll so that recorded messages or sounds appear to be coming from the doll. The playback unit employs a magnetic tape as the recording medium. The playback unit has two reels, one for holding the magnetic tape and one for taking up the tape as it is unwound. The reels are driven by a motor which is controlled by the operator. The tape, on the reels, moves across a magnetic pickup head which transmits the recorded message, on the tape, to an amplifier. The amplified message is transmitted to a speaker from which the recorded message is heard.

The tape has two sound tracks so that one recording is played back as the tape is wound and another recording is played back as the tape is unwound. The magnetic pickup head is moved up or down so that the upper or lower sound track may be heard.

The playback unit has a pair of limit switches assoiated with the slack in the magnetic tape as it moves from reel to reel so that as the tape becomes unwound and nears the end of its recorded message the tape becomes taut and opens a limit switch shutting off all power.

The invention has other objects and advantages which will appear from the following description of a particular embodiment of the invention in conjunction with the accompanying drawings, in which.

Figure 1:
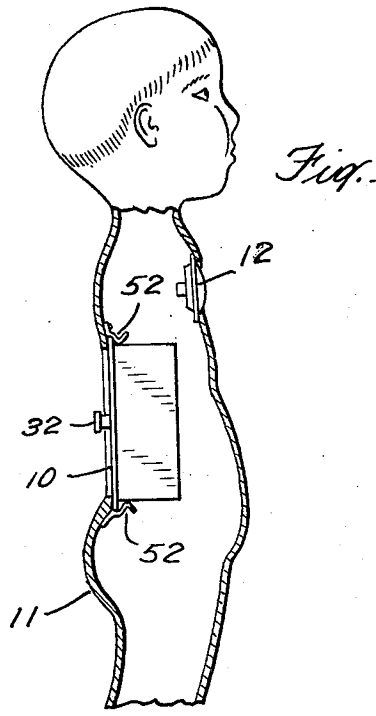
FIG. 1 is a view showing the playback unit and speaker within the body of a doll.

With reference to FIG. 1 a playback unit 10 is positioned so as to be within the body of a doll 11, the playback unit being held in this position by clips 52. A speaker 12 is mounted on the chest of the doll and is electrically connected to the playback unit 10.

Figure 3:
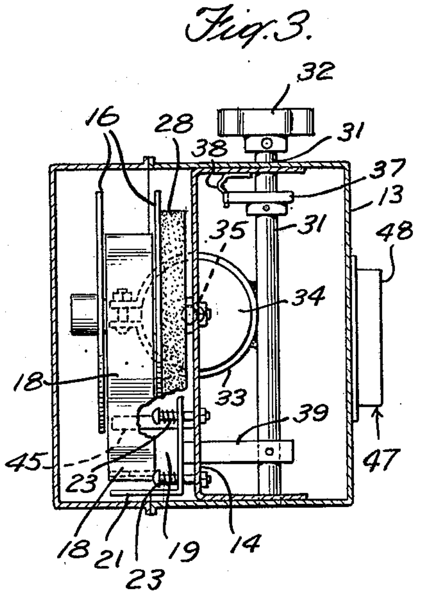
FIG. 3 is a side sectional view of the playback unit taken along lines 3—3 of FIG. 2.
Figure 2:
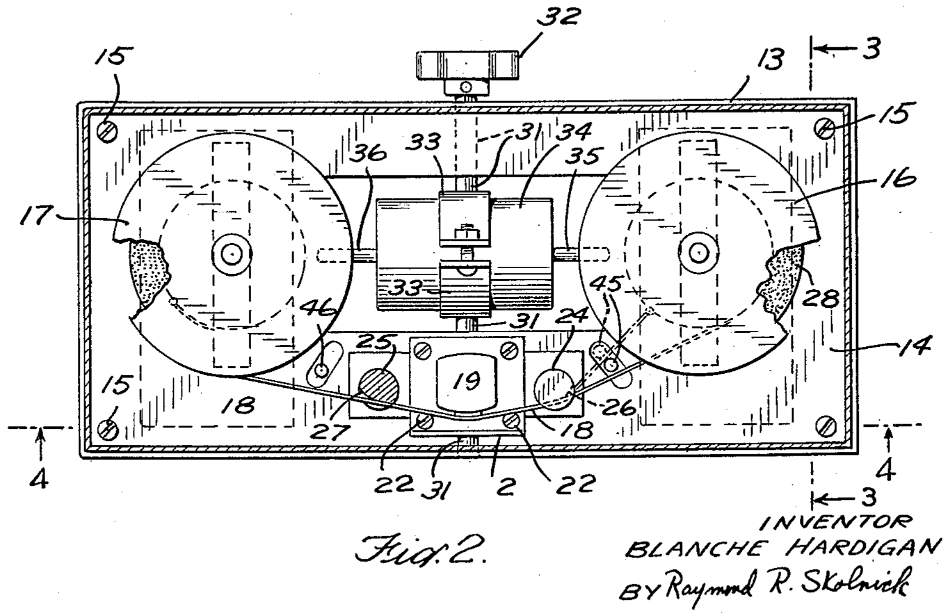
FIG. 2 is a plan view of the playback unit.
Figure 4:
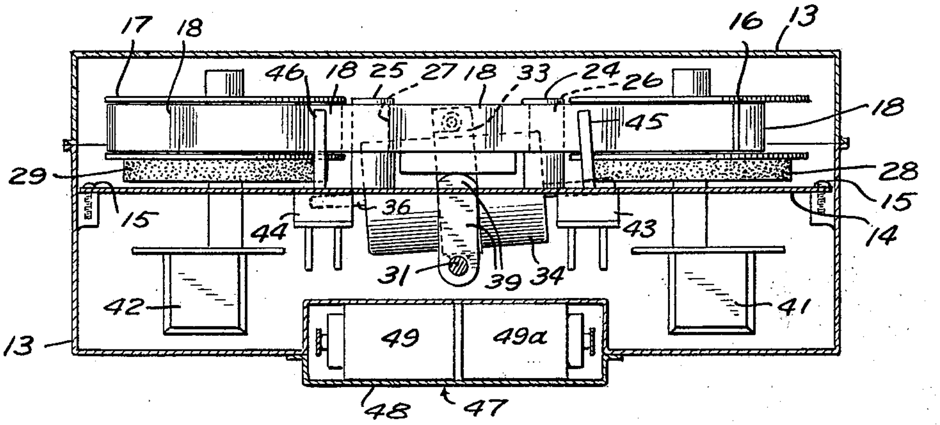
FIG. 4 is in front sectional view of the playback unit taken along lines 4—4 of FIG. 2.

As shown in FIGS. 2, 3 and 4 the playback unit consists of a case 13 which is made in two parts, an upper and lower part. Within the case is a mounting plate 14 which is held within the case 13 by four screws 15. Mounted on the upper side of the mounting plate 14 are two reels 16 and 17. The reels have wound thereon a magnetic tape 18 which has two sound tracks thereon, an upper and a lower sound track. The tape passes across a magnetic pickup head 19 which is fastened to a bracket 21. The backet 21 is resiliently mounted onto the mountting plate 14 by means of shouldered screws 22. Biasing the bracket 21 are springs 23 which are mounted about the shouldered screws 22 so as to be between the bracket 21 and the heads of the shouldered screws. The purpose for resiliently mounting the bracket is that the pickup head can be postioned to pick up the recorded message on either of the two sound tracks on the magnetic tape.

The magnetic tape 18 is guided across the pickup head by two guide posts 24 and 25. The guide posts are round and mounted on the mounting plate 14 one on each side of the pickup head 19, respectively. There are flats 26 and 27 milled on the guide posts 24 and 25, respectively. These flats restrict the up or down movement of the tape as the pickup head is moved up or down.

Attached to the reels 16 and 17 on the under parts thereof are rubber discs 28 and 29 respectively. A shaft 31 having a knob 32 at one end passes through the bottom of the case 13. The shaft has a clamp 33 welded thereto within which is captured a motor 34. The motor has shaft extensions 35 and 36 on either side thereof. When the knob 32 is turned clockwise (looking at knob) the motor 34 is tilted so that shaft extension 35 contacts rubber disc 28 and when the knob 32 is turned counterclockwise (looking at knob) then the motor shaft extension 36 contacts the rubber disc 29. The shaft 31 is held in the position it is turned to by a cam 37, which is affixed to the shaft 31, being locked in different positions by a detent spring 38 which is attached to the underside of mounting plate 14.

Attached to the shaft 31 in vertical alignment with the magnetic pickup head 19 is another cam 39. As the shaft 31 is turned counterclockwise the cam 39 pushes against the bracket 21 thereby raising the position of the pickup head 19. When the shaft 31 is turned clockwise the cam 39 is moved from under the bracket 21 and the springs 23 push the bracket down thereby lowering the position of the pickup head 19.

A dual amplifier, made in two parts 41 and 42, is mounted on the underside of mounting plate 14. Amplifier 41 is mounted below reel 16 and amplifier 42 is mounted below reel 17.

Mounted to the underside of the mounting plate 14 are two limit switches 43 and 44, switch 43 being in close proximity to reel 16 and switch 44 being in close proximity to reel 17. The switches 43 and 44 have actuating arms 45 and 46, respectively, which are actuated by the magnetic tape 18. For example, as the reel 17 is being wound with the tape 18, reel 16 is being unwound. When the reel 16 is completely unwound the tape 18 assumes the position as shown in FIG. 2. The tape in this position forces the actuating arm 45 back and thereby actuates the limit switch 43.

At the bottom of the case 13 is a built-in receptacle 47 which has an access cover 48. The receptacle is used to hold a power supply which is in the form of two batteries, 49 and 49*a* respectively. The battery 49 supplies the power for the amplifiers 41 and 42 and the dual magnetic pickup head 19 while the battery 49*a* supplies the power for the motor 34.

Figure 5:
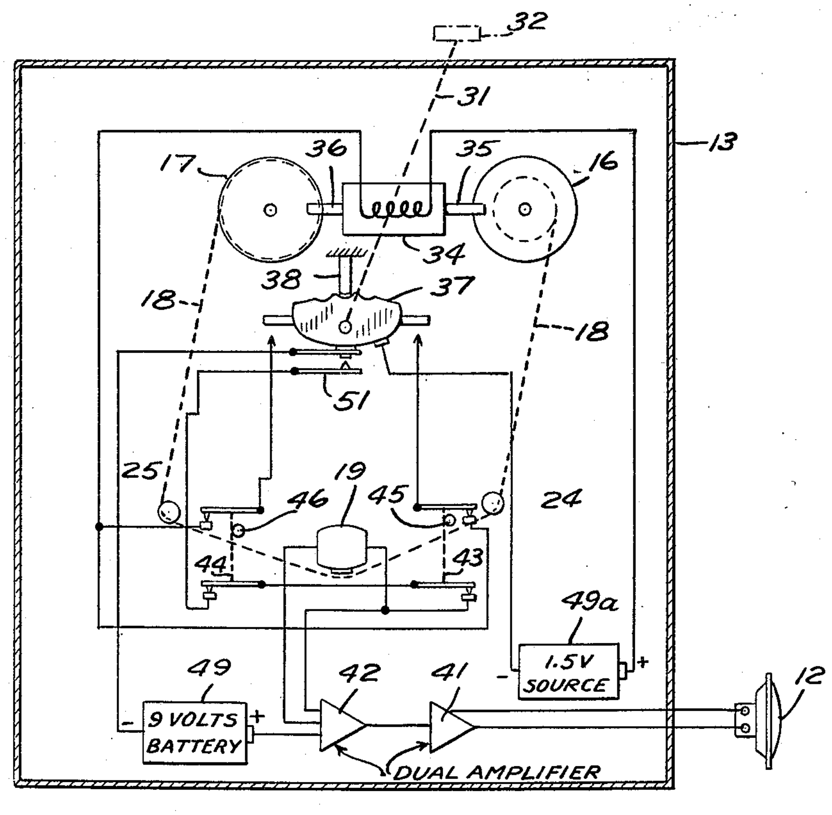
FIG. 5 is a schematic representation of a particular means for the electrical circuitry of the invention.

The operation of the invention will now be explained in conjunction with FIG. 5 to indicate how the parts enumerated above operate together to perform a useful function in a new and novel manner.

Assuming a child playing with the doll 11 wishes to hear the doll talk or sing. The magnetic tape 18 which is changeable for different messages has two tracks. On each of these tracks are different messages, songs or one long message or song. The child turns the knob 32 in the direction of the full reel. Let us presume that the full reel is 17 and the empty reel is 16, therefore, the child turned the knob 32 in a clockwise direction (looking at the knob). The turning of the knob turned shaft 31 which in turn tilted the motor 34 so that its extended shaft contacted the rubber disc 28 which is under the reel 16. The shaft 31 also turned cam 37, which by turning closed a circuit across the motor 34 through a 1.5 volt power supply 49*a* and limit switch 44. The cam 37 also closed amplifier switch 51 so that a circuit is completed across the amplifier 42 and magnetic pickup head 19 through limit switches 44 and 43 respectively and a 9 volt power supply 49. Amplifier 42 feeds amplifier 41 which in turn is connected to the speaker 12.

The motor 34 being energized now drives the reel 16 by virtue of the shaft 35 turning the disc 28. As the reel 16 turns the limit switch 43 is released and closed. The tape 18 passes across the magnetic pickup head 19 which is in a lowered position and therefore reads the lower recorded message. The signals from the tape are sent by the pickup head to the amplifier 42 which in turn sends the signals to amplifier 41. The amplified signals are then sent to the speaker 12 where the signals are converted to intelligent sounds. When the tape 18 reaches the end of its message, reel 17 is unwound and the tape pushes against the actuating arm 46 actuating the limit switch 44. This shuts off the power to the motor 34 and also shuts off the power to the amplifier.

If the child wishes to hear more then the child reverses the above process by turning the knob 32 counterclockwise. This tilts the motor 34 so that its extended shaft 36 contacts the rubber disc 29 which is on the underside of the reel 17. The cam 37 closes switch 51 completing a circuit across the amplifier and pickup head through a 9 volt power supply 49 and also completes a circuit across the motor 34 through limit switch 43 and the 1.5 volt power supply 49*a*. The shaft 31 also moves cam 39 so that it positions the bracket 21 carrying the magnetic pickup 19 so that the pickup now reads the upper track of the tape 18. Reel 17 now rotates winding up the tape 18. When the tape 18 reaches the end of the message on the upper track, reel 16 is unwound and the tape pushes against the actuating arm 46 of the limit switch 44. This actuates the limit switch 44 shutting off the power supply to the motor 34 and to the amplifier and pickup head.

Whenever the child tires of listening to the recorded message the child can shut off the playback unit by turning the knob 32 to its off position. In this position all power is turned off. The child can also change the messages by simply removing the playback unit from the doll body and changing the reel that is within the playback unit to a new reel which would have another recorded message on the tape stored thereon.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. A talking doll consisting of a doll body having a head, arms and legs, a case mounted within the body of said doll at the rear thereof, a pair of reels detachably mounted within said case, a pair of rubber discs, one disc being affixed to each of said reels, a magnetic tape having two sound tracks, said tape being wound on one of said reels and connected to the other of said reels, a magnetic pickup head which is resiliently mounted within said case in close proximity to said tape, a pair of guide posts mounted in juxtaposition with said tape for guiding said tape cross said pickup head, a shaft extending through said case, a cam fixed to said shaft in vertical alignment with said pickup head for moving said pickup head up or down upon said shaft being rotated, a motor transversely mounted on said shaft for rotation therewith, said motor having an armature shaft which extends on either side thereof for contacting said rubber discs, a speaker mounted within the chest of said doll body, an amplifier connected between said magnetic pickup head and said speaker, a pair of limit switches mounted one on each side of said pickup head in juxtaposition with said tape so that the tautness of the tape upon becoming unwound will actuate the limit switch in proximity to it, and a power means connected to said motor, said magnetic pickup head, and said amplifier through said limit switches.

2. A talking doll as claimed in claim 1 wherein a second cam is fixed to said shaft, said cam having depressions therein coinciding with on, off, and on positions, a detent spring mounted on said case in close proximity to said second cam for holding said shaft in a particular position and a contact switch mounted so as to be actuated by said second cam in its on positions, said contact switch being connected between said power means and one of said limit switches.

3. A talking toy consisting of a toy body, a case mounted within said toy body, a pair of reels detachably mounted within said case, a pair of rubber discs, one disc being affixed to each of said reels, a magnetic tape having two sound tracks, said tape being wound on one of said reels and connected to the other of said reels, a magnetic pickup head which is resiliently mounted within said case in close proximity to said tape, a pair of guide posts mounted in juxtaposition with said tape for guiding said tape across said pickup head, a shaft extending through said case, a cam fixed to said shaft in vertical alignment with said pickup head for moving said pickup head up or down upon said shaft being rotated, a motor transversely mounted on said shaft for rotation therewith, said motor having an armature shaft which extends on either side thereof for contacting said rubber discs, a speaker mounted within said toy body, an amplifier connected between said magnetic pickup head and said speaker, a pair of limit switches mounted one on each side of said pickup head in juxtaposition with said tape so that the tautness of the tape upon becoming unwound will actuate the limit switch in proximity to it, and a power means connected to said motor, said magnetic pickup head, and said amplifier through said limit switches.

4. A talking toy as claimed in claim 3 wherein a second cam is fixed to said shaft, said cam having depressions therein coinciding with on, off, and on positions, a detent spring mounted on said case in close proximity to said second cam for holding said shaft in a particular position and a contact switch mounted so as to be actuated by said second cam in its on positions, said contact switch being connected between said power means and one of said limit switches.

References Cited in the file of this patent

UNITED STATES PATENTS

| | | |
|---|---|---|
| 2,309,542 | Rothberg | Jan. 26, 1943 |
| 2,668,059 | Roberts | Feb. 2, 1954 |
| 2,933,319 | Proctor | Apr. 19, 1960 |
| 2,954,940 | Herrmann | Oct. 4, 1960 |
| 2,973,156 | Draheim | Feb. 28, 1961 |

FOREIGN PATENTS

| | | |
|---|---|---|
| 646,668 | Great Britain | Nov. 29, 1950 |